United States Patent
Gronau et al.

(10) Patent No.: US 7,245,206 B2
(45) Date of Patent: Jul. 17, 2007

(54) METHOD FOR ASSIGNING WHEELS OF A MOTOR VEHICLE TO THE RESPECTIVE VEHICLE AXLE

(75) Inventors: Ralph Gronau, Wetter (DE); Peter Säger, Friedrichsdorf (DE); Dirk Leise, Rüsselsheim (DE)

(73) Assignee: Continental Teves AG & Co. oHG (DE)

( * ) Notice: Subject to any disclaimer, the term of this patent is extended or adjusted under 35 U.S.C. 154(b) by 180 days.

(21) Appl. No.: 10/522,272

(22) PCT Filed: Jul. 29, 2003

(86) PCT No.: PCT/EP03/08364

§ 371 (c)(1),
(2), (4) Date: Jan. 25, 2005

(87) PCT Pub. No.: WO2004/014669

PCT Pub. Date: Feb. 19, 2004

(65) Prior Publication Data

US 2005/0248448 A1 Nov. 10, 2005

(30) Foreign Application Priority Data

Aug. 2, 2002 (DE) ................................. 102 35 625

(51) Int. Cl.
*B60R 25/10* (2006.01)
*B60C 23/00* (2006.01)

(52) U.S. Cl. ................ 340/426.33; 350/445; 350/447; 350/665; 73/146.5; 180/290

(58) Field of Classification Search ............ 340/426.33
See application file for complete search history.

(56) References Cited

U.S. PATENT DOCUMENTS

| | | | | |
|---|---|---|---|---|
| 5,032,821 A | * | 7/1991 | Domanico et al. | 340/440 |
| 6,144,295 A | * | 11/2000 | Adams et al. | 340/442 |
| 6,203,045 B1 | * | 3/2001 | Kyrtsos et al. | 280/405.1 |
| 6,278,363 B1 | | 8/2001 | Bezek et al. | |
| 6,578,648 B2 | * | 6/2003 | Bell | 180/24.11 |

FOREIGN PATENT DOCUMENTS

| | | |
|---|---|---|
| DE | 42 05 911 A1 | 9/1993 |
| DE | 199 51 273 A1 | 6/2001 |
| WO | WO 02/072369 A1 | 9/2002 |

* cited by examiner

*Primary Examiner*—Donnie L. Crosland
(74) *Attorney, Agent, or Firm*—Ratner Prestia

(57) ABSTRACT

A method for allocating wheels of a motor vehicle to a respective vehicle axle, each of the wheels includes an inflation tire whose tire pressure is monitored by a tire pressure monitoring device including at least one transmitting module in each wheel, and at least one receiving module arranged at or in the vehicle and one evaluation module, with each transmitting module transmitting tire pressure information and a wheel-specific identification number to the receiving module, which are sent to an evaluation process in the evaluation module, and tire pressure changes of the wheels are considered for the allocation, with the wheels having almost identical tire pressure changes being allocated to one vehicle axle by taking into account a vehicle-specific axle load.

10 Claims, 2 Drawing Sheets

METHOD FOR ASSIGNING WHEELS OF A MOTOR VEHICLE TO THE RESPECTIVE VEHICLE AXLE

TECHNICAL FIELD

The present invention relates to a method for allocating wheels of a motor vehicle to the respective vehicle axle, said wheels including an inflation tire each, whose tire pressures are monitored by a tire pressure monitoring device including at least one transmitting module in each wheel, and at least one receiving module arranged at or in the vehicle and one evaluation module, with each transmitting module transmitting tire pressure information and a wheel-specific identification number to the receiving module, which are sent to an evaluation process in the evaluation module.

BACKGROUND OF THE INVENTION

Tire pressure monitoring devices of this type are used in particular for measuring the tire pressure of motor vehicle wheels. A wrong tire pressure causes an unnecessarily high amount of tire wear and higher fuel consumption. Further, the tire can become damaged or suddenly destroyed due to an increased flexing energy, especially at too low tire pressure, which may lead to serious accidents in traffic.

DE 4205911 A1 discloses a monitoring device for the inflation pressure of tires of vehicle wheels. The realization presented in this application is, however, very sophisticated. One mentioned embodiment includes an associated receiver at the vehicle for each transmitter in the wheel, while another embodiment is based on a combined transmitting/receiving unit in the wheel and one or more receiving devices at the vehicle. The individual wheels are associated with the mounting positions by way of a so-called pairing process performed either manually or automatically. The manual pairing process is very time-consuming and labor-intense and, in the event of faulty handling, can cause a wrong allocation of the individual wheels to the mounting positions. Fail-free allocation of the individual wheels to the mounting positions is possible in the automatic pairing process, however, the technical effort needed is very extensive and, hence, costly.

Further, WO 02/072369 A1 discloses a method of determining the mounting positions (front left wheel, rear right wheel, etc.) of the vehicle wheels. The method mentioned in this publication is based on a measurement of the vehicle wheel temperatures, and allocation of the vehicle wheels to the respective mounting position takes place by way of the evaluation of the vehicle wheel temperatures in dependence on special detecting driving maneuvers. In this arrangement, the wheels exhibiting the highest temperature values are allocated to the driven axle. This allocation is, however, not correct because the temperature increase of the wheels mainly depends on vehicle-specific axle load rather than on the driven axle.

BRIEF SUMMARY OF THE INVENTION

In view of the above, an object of the invention is to provide a method permitting an automatic allocation of the wheels to the vehicle axles in a simple fashion by taking into consideration the vehicle-specific axle load.

According to the invention, this object is achieved by a method for allocating wheels of a motor vehicle to the respective vehicle axle wherein the tire pressure changes of the wheels are considered for the allocation, and the wheels having almost identical tire pressure changes being allocated to one vehicle axle by taking into account a vehicle-specific axle load.

The method of the invention is based on the knowledge about the vehicle-specific axle load. Based on this vehicle-specific axle load, information is stored e.g. in the evaluation process indicating which vehicle axle, i.e. front or rear axle, is defined as the axle subjected to higher load under constructive aspects. The method of the invention determines those wheels exhibiting the highest tire pressure changes of all wheels. As experience shows, the highest tire pressure changes occur at the wheels subjected to maximum load, with said maximally loaded wheels being disposed on the vehicle axle subjected to maximum load. The result is an allocation of the maximally loaded wheels to the vehicle axle subjected to maximum load and, when knowing about the vehicle-specific axle load, an allocation of the wheels to the respective vehicle axles, i.e. front or rear axle.

According to the invention, the vehicle-specific axle load basically refers to the static and dynamic axle load distribution of the respective vehicle. The static axle load distribution describes herein the purely static dead weight of the respective axle, for example, caused by the mounting position of the engine or due to the loading of the vehicle. The dynamic axle load distribution describes e.g. the effects of a braking operation or the influence of aerodynamic measures (spoiler) on the axle load distribution.

The tire inflation pressures of the individual wheels are preferably compared with each other over a defined, cyclically recurrent period of time, said period of time especially ranging from roughly 50 to roughly 900 seconds.

In a favorable improvement of the method, two identification numbers of the wheels with the greatest tire pressure changes, compared to the tire pressure changes of all wheels, are stored in a memory.

In another advantageous embodiment of the method, the identification numbers with the greatest tire pressure changes obtained from a subsequent period of time are compared with the identification numbers already stored in the memory. It is expedient that the contents of the memory is preserved, and a count of a counter is increased by one when the identification numbers already stored in the memory are identical with the identification numbers obtained from a subsequent period of time.

According to another favorable embodiment of the method, the two wheels having their identification numbers stored in the memory are allocated to the vehicle axle that is considered as being subjected to higher load when a determinable threshold value of the counter's count is reached.

The determinable threshold value is preferably in the range of roughly 20 to roughly 100.

It is arranged for in another favorable embodiment of the method that information is stored in the evaluation module indicating which vehicle axle is considered as the axle subjected to higher load.

Besides, it is advantageous that the transmitting module will transmit tire pressure information only starting from a predefinable wheel speed.

DETAILED DESCRIPTION OF THE PREFERRED EMBODIMENTS

Figure 1:
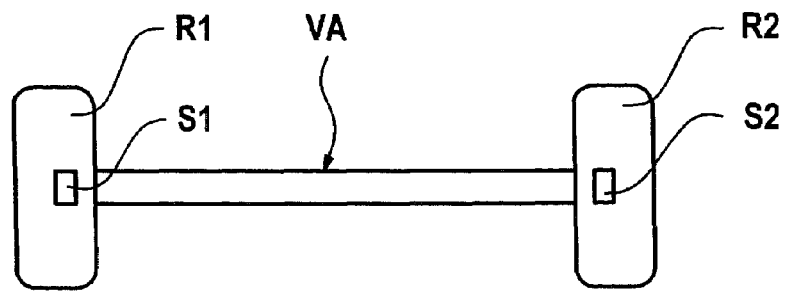
FIG. 1 is a schematic setup of a vehicle equipped with a tire pressure monitoring device.
Figure 1:
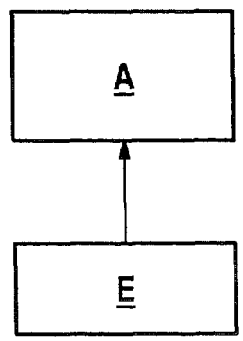
Figure 1:
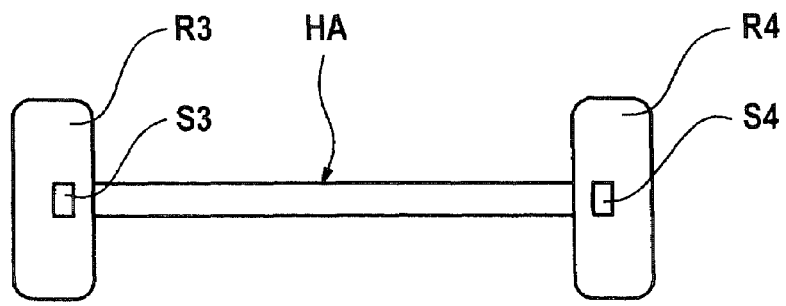

FIG. 1 represents a vehicle with four inflated wheels R1 to R4 disposed on a front axle VA and a rear axle HA. Further, each wheel R1 to R4 is equipped with a transmitting module S1 to S4. These transmitting modules S1 to S4 include batteries feeding the transmitting modules S1 to S4 with energy. Besides, so-called roller switches can be provided in the transmitting modules S1 to S4 that allow a contact between the batteries and the transmitting modules S1 to S4 only starting with an adjustable wheel speed. These roller switches are used to achieve a longer useful life of the batteries because there is no permanent energy supply to the transmitting modules. In addition, the transmitting modules S1 to S4 includes measuring devices, which determine the tire inflation pressure of the individual wheels R1 to R4. Further, each transmitting module S1 to S4 has an individual identification number. Said identification number is transmitted along with the respective tire inflation pressure to the receiving module E. This is preferably done by way of radio transmission. The receiving module E transmits the data received to an evaluation module A. An indication unit can be connected subsequent to the evaluation module A, informing the vehicle operator, e.g. in a display, about the tire pressure of the wheels R1 to R4.

Figure 2:
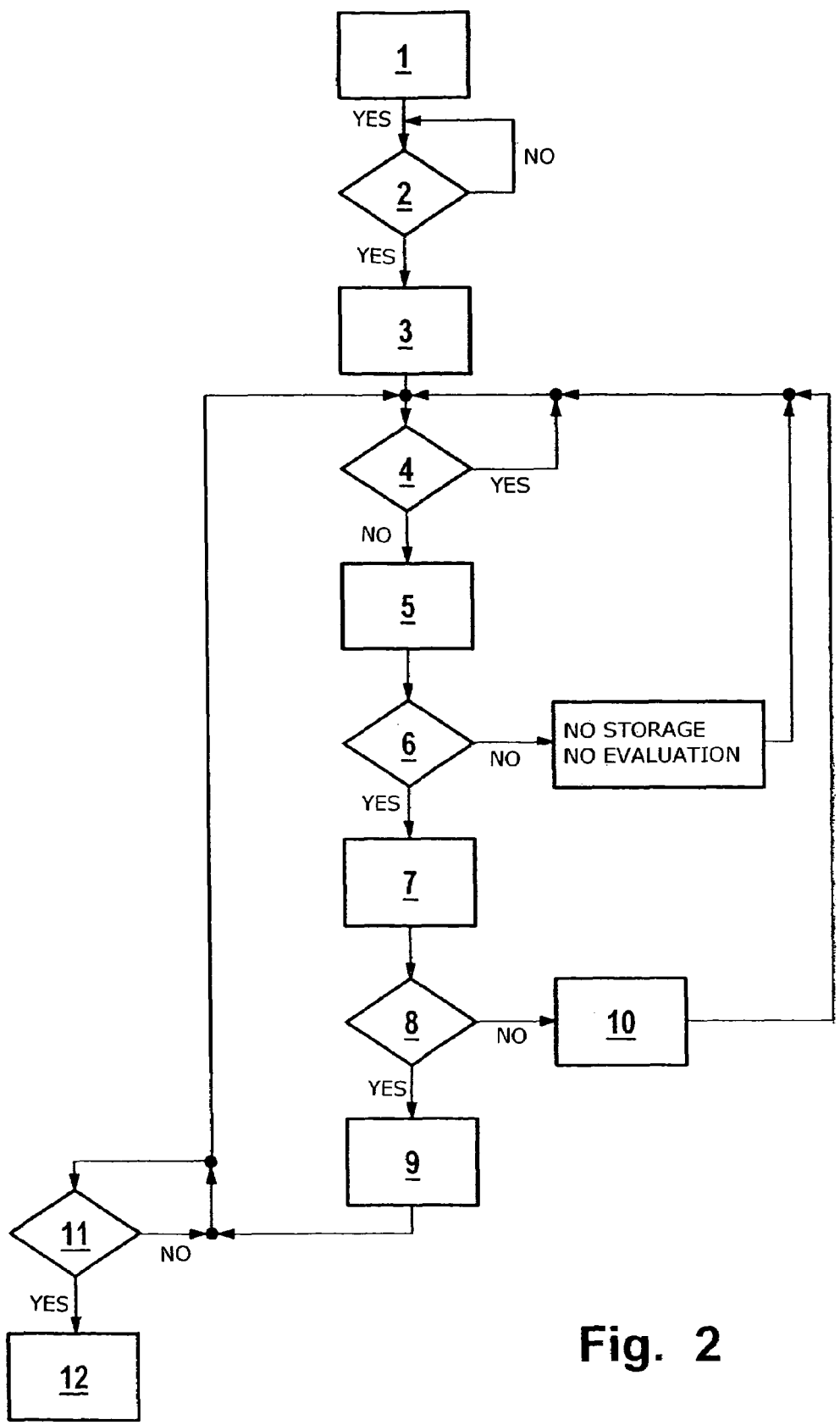
FIG. 2 is a flow chart for illustrating an example of the method.

FIG. 2 shows a flow chart illustrating the function of the method. When the ignition 1 is switched on and a wheel speed is reached that is sufficient to close the roller switch 2, transmission 3 of the tire pressure data and the identification numbers takes place from the individual transmitting modules S1 to S4 to the receiving module E. Receiving module E leads the data received to the evaluation process. The individual tire pressures of the wheels are compared with respect to a pressure change in a step 4 over a cyclically recurrent period of time, preferably in the range of roughly 50 to roughly 900 seconds. It is herein determined whether the tire pressure of an individual wheel has changed within the period of time. This routine will not be left as long as the tire pressure of only one single wheel changes. In case a change in pressure is no longer encountered on any of the wheels, a so-called maintaining phase 5 is detected. Said maintaining phase 5 describes an almost constant driving situation such as driving at a relatively constant speed. When said maintaining phase 5 is detected, a comparison 6 of the tire pressures of the individual wheels is carried out.

Preferably, a pressure difference between e.g. a current tire pressure value of a wheel and a previously sent tire pressure value of the same wheel rather than the absolute pressure of the wheels is compared. Said pressure difference allows concluding whether a wheel is disposed at a vehicle axle subjected to higher load or a vehicle axle subjected to lower load, respectively. With an axle that is subjected to higher load, hence the wheels on this axle being subjected to higher load, the temperature of these wheels will rise due to said load. The tire pressure will also rise due to this temperature rise.

Vehicle-specific information is sent to the evaluation process, from which it is apparent which axle of the respective vehicle is considered as being subjected to higher load under constructive aspects so that the wheels subjected to higher load are allocated to the axles considered as being subjected to higher load under constructive aspects. The vehicle-specific information can be stored in a memory, for example. When the pressure differences of the individual wheels are compared, the evaluation process will first of all determine whether the pressure differences are equal or very similar in all wheels. If this is the case, the pressure differences will neither be stored nor evaluated, and the evaluation process starts again in the first step 4.

When the pressure differences of the wheels differ from each other, storage 7 is executed, and the two identification numbers of the wheels in a four-wheel vehicle having the highest pressure difference values in the monitoring cycles are written in the memory. Alternatively, it is of course also possible to write the identification numbers of the wheels having the lowest pressure difference values in the memory.

A comparison between the identification numbers already stored in the memory and new identification numbers determined in a following cycle takes place in a subsequent step 8. When the already stored identification numbers are identical with the newly defined identification numbers, the memory content is preserved in a first case 9, and a count of a counter is increased by one. When the newly defined identification numbers are not identical with the identification numbers already stored in the memory, the memory content is overwritten with the new identification numbers and the count of the counter lowered by one in a second case 10, said count of the counter including only positive values. The rise or lowering of the counter's count by one shall only be referred to herein as a possible embodiment. It is of course also possible that the counter has a hysteresis, or the counter can be reset. A return to step 4 and, thus, a re-run of the evaluation process takes place in both cases 9, 10. Polling 11 of the counter's count will take place subsequently. It is determined by a comparison whether the counter's count has exceeded a predeterminable threshold value, preferably in the range of roughly 20 to roughly 100. If this is the case, there will be an allocation 12, and the wheels R1 to R4 whose identification numbers are stored in the memory are allocated to the axle that is considered as being subjected to higher load, or to the axle that is considered as being subjected to lower load, respectively. The previously stored information indicating which axle of the vehicle under review is considered as the axle subjected to higher load or as the axle subjected to lower load, respectively, allows the evaluation process to allocate two wheels either to the front axle or to the rear axle, and thus the other two wheels are automatically allocated to the remaining vehicle axle. The content of the memory and the count of the counter are maintained also after the ignition is switched off. If e.g. tires are changed, and the wheels are no longer mounted on the vehicle axle where they were originally mounted, the evaluation process will detect this condition because the identification numbers being transmitted starting with the change of tires no longer correspond with the contents of the memory. Over several periods of time, the contents of the memory is overwritten with the currently prevailing identification numbers and the count of the counter is respectively increased by one until the threshold value is exceeded, with the result of a new allocation of the wheels R1 to R4 to the respective axles.

The invention claimed is:

1. A method for allocating wheels of a motor vehicle to a respective vehicle axle, each of said wheels including an inflation tire whose tire pressure is monitored by a tire pressure monitoring device including at least one transmitting module in each wheel, and at least one receiving module arranged at or in the vehicle and one evaluation module, with each transmitting module transmitting tire pressure information and a wheel-specific identification number to the receiving module, which are sent to an evaluation process in the evaluation module, wherein tire pressure changes of the wheels are considered for the allocation, and the wheels having almost identical tire pressure changes are allocated to one vehicle axle by taking into account a vehicle-specific axle load.

2. The method as claimed in claim 1,
wherein the tire inflation pressures of the individual wheels are compared with each other with respect to almost constant tire pressures of the individual wheels over a defined, cyclically recurrent period of time.

3. The method as claimed in claim 2,
wherein the two identification numbers of the wheels with the greatest tire pressure changes, compared to the tire pressure changes of all wheels, are stored in a memory.

4. The method as claimed in claim 3,
wherein the identification numbers of the wheels with the greatest tire pressure changes obtained from a subsequent period of time are compared with the identification numbers already stored in the memory.

5. The method as claimed in claim 4,
wherein the contents of the memory is preserved, and a count of a counter is increased by one when the identification numbers already stored in the memory are identical with the identification numbers obtained from a subsequent period of time.

6. The method as claimed in claim 5,
wherein when a determinable threshold value of the counter's count is reached, the two wheels having their identification numbers stored in the memory are allocated to the vehicle axle that is considered as being subjected to higher load.

7. The method as claimed in claim 6,
wherein the determinable threshold value is in the range of roughly 20 to roughly 100.

8. The method as claimed in claim 6,
wherein information is stored in the evaluation module indicating which vehicle axle is considered as the axle subjected to higher load.

9. The method as claimed in claim 1,
wherein the transmitting module will transmit tire pressure information only starting from a predefinable wheel speed.

10. The method as claimed in claim 2,
wherein said period of time ranging from roughly 50 to roughly 900 seconds.

* * * * *